(12) United States Patent
Kertesz

(10) Patent No.: US 8,394,472 B2
(45) Date of Patent: Mar. 12, 2013

(54) STRUCTURAL COMPONENT WITH TUBULAR SECTION

(75) Inventor: Janos Kertesz, Hofheim (DE)

(73) Assignee: Norma Germany GmbH, Maintal (DE)

( * ) Notice: Subject to any disclaimer, the term of this patent is extended or adjusted under 35 U.S.C. 154(b) by 828 days.

(21) Appl. No.: 11/217,222

(22) Filed: Sep. 1, 2005

(65) Prior Publication Data

US 2006/0051548 A1  Mar. 9, 2006

(30) Foreign Application Priority Data

Sep. 4, 2004 (DE) .......... 10 2004 042 847

(51) Int. Cl.
F16L 13/00 (2006.01)
F16L 47/00 (2006.01)

(52) U.S. Cl. .......... 428/35.7; 428/36.9; 428/36.91; 285/288.1; 285/21.1; 285/141.1; 285/189; 285/285.1

(58) Field of Classification Search .......... 285/285.1, 285/288.1, 141.1, 21.1, 189; 137/202
See application file for complete search history.

(56) References Cited

U.S. PATENT DOCUMENTS

| | | | | |
|---|---|---|---|---|
| 7,066,498 B2 * | 6/2006 | Kertesz | .......... | 285/288.1 |
| 2004/0051305 A1 | 3/2004 | Kertesz | | |

FOREIGN PATENT DOCUMENTS

| | | |
|---|---|---|
| DE | 42 39 909 | 5/1994 |
| DE | 196 17 349 | 9/1997 |
| DE | 100 48 973 | 7/2001 |
| DE | 200 22 716 | 4/2002 |
| EP | 1 396 326 | 3/2004 |
| JP | 51 121070 | 10/1976 |
| JP | 2003 300542 | 10/2003 |
| JP | 2003300542 | 10/2003 |

OTHER PUBLICATIONS

Moerwald K: "Einblick in Die Konstruktion Von . . . "; Isernhagen Hannover, DE; No. 1, Jan. 1962, pp. 8-14, XP009050568.
"Artikelgestalung Und Werkzeugkonstruktion Bei Der . . . "; Speyer Am Rhein; BD. 12, No. 10, Oct. 1961, pp. 453-458, XP001173327.

* cited by examiner

*Primary Examiner* — Ellen S Wood
(74) *Attorney, Agent, or Firm* — Lucas & Mercanti, LLP; Klaus P. Stoffel

(57) ABSTRACT

A structural component with a tubular section, particularly a structural component of a fluid line, has at least two materials with different stiffness and/or creeping strength, wherein the materials include thermoplastic synthetic materials and wherein the material having the greater stiffness and/or creeping strength is embedded in the other material. The tubular section has a continuous annular surface which extends coaxially with the longitudinal center axis of the structural component and has the same material which has been injection molded over the annular surface in a predetermined quantity ratio relative to the outer material, or between 40% and 100% of the annular surface are composed of the same injection molded material and are distributed in uniform spacings in circumferential direction of the annular surface.

6 Claims, 5 Drawing Sheets

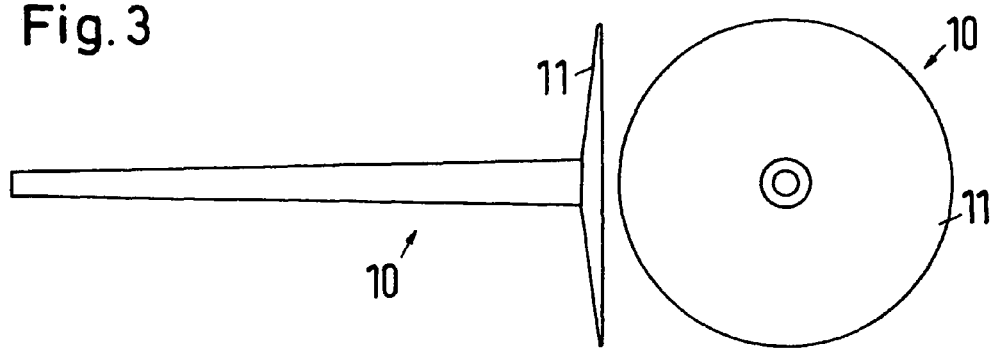
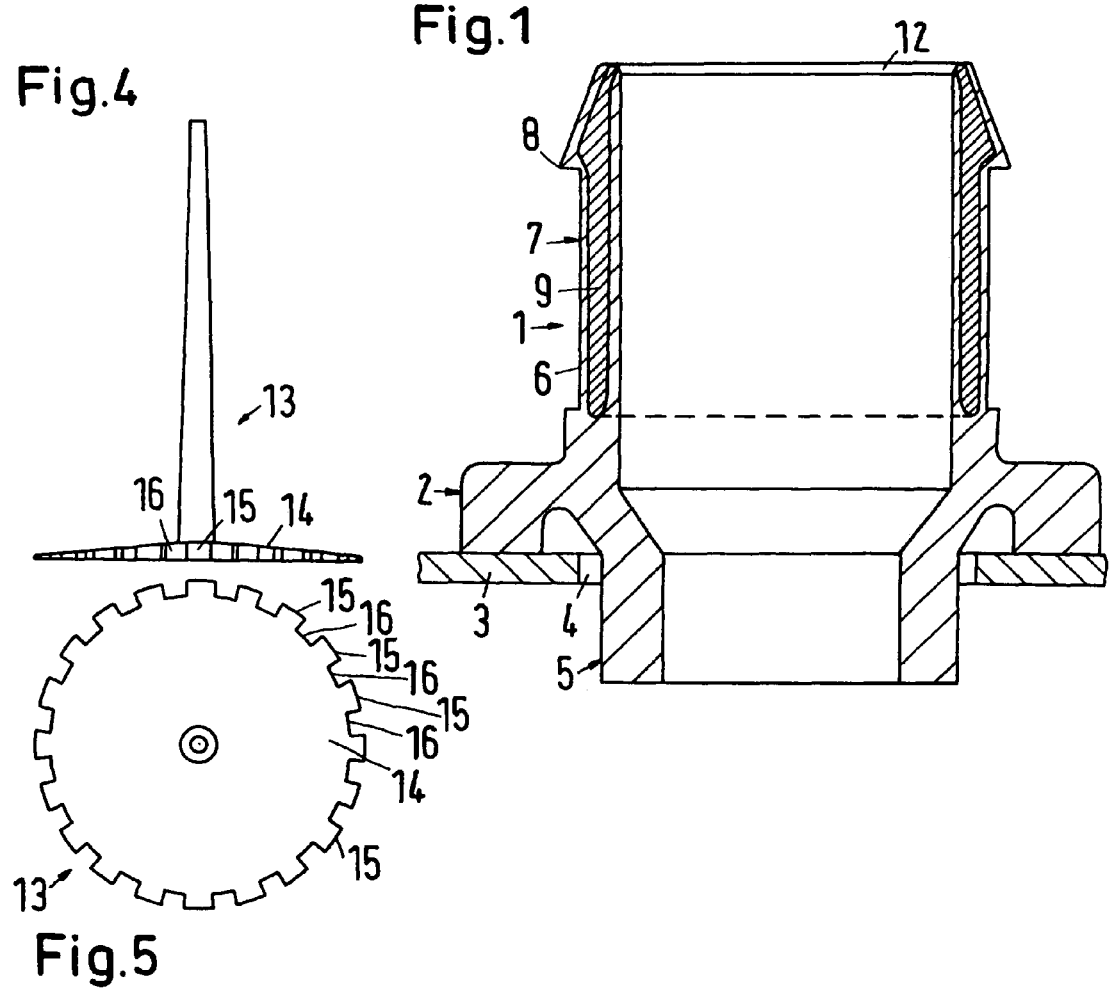

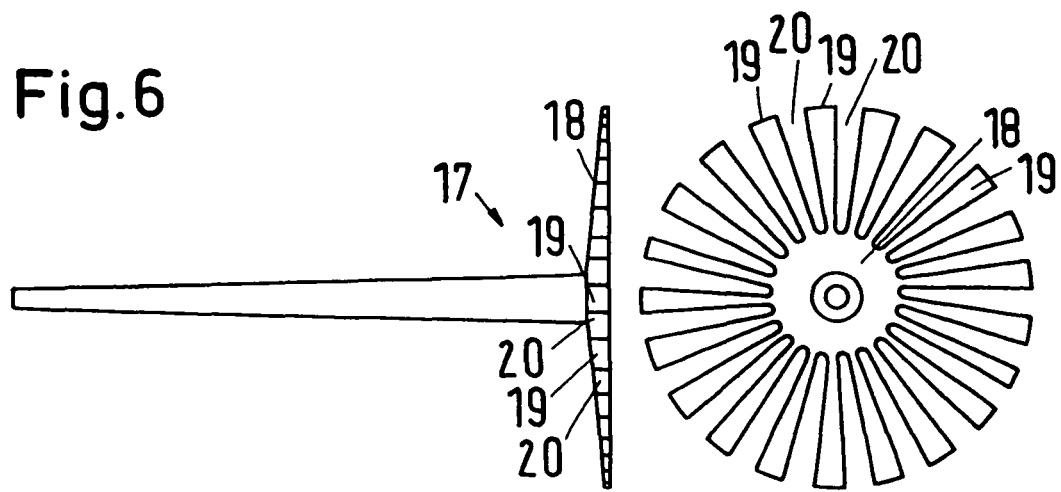
Fig. 6
Fig. 7
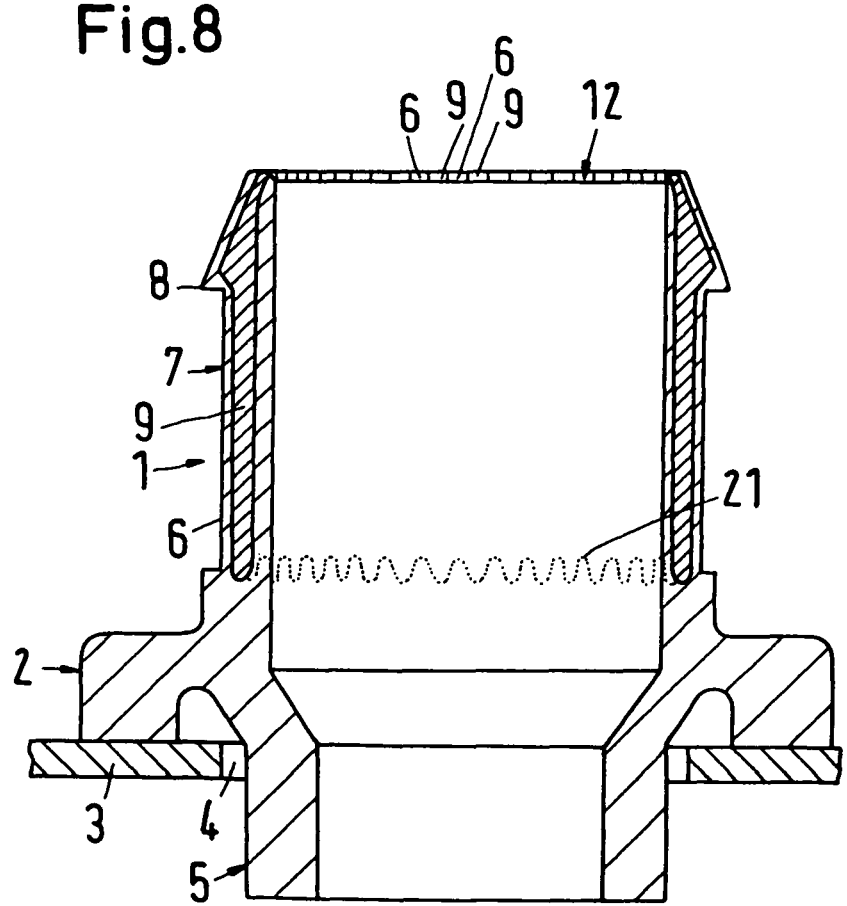
Fig. 8

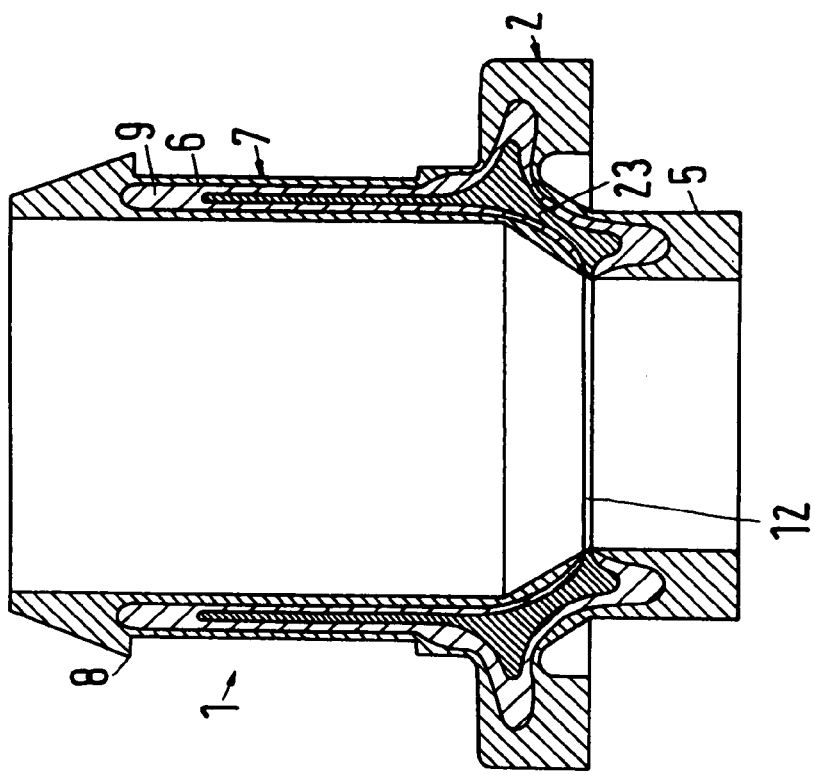
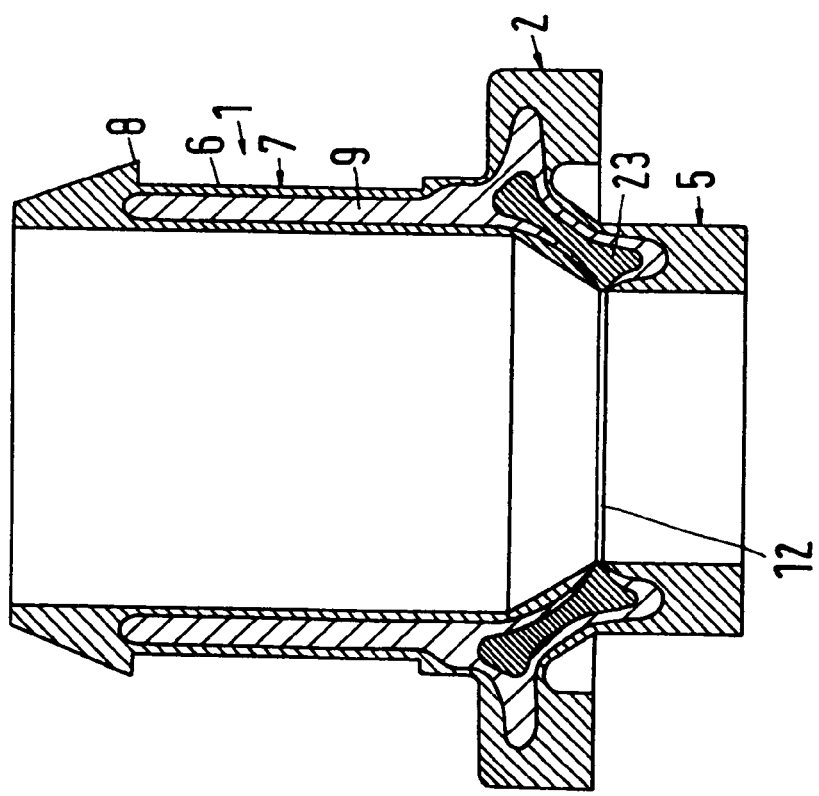

STRUCTURAL COMPONENT WITH TUBULAR SECTION

BACKGROUND OF THE INVENTION

1. Field of the Invention

The present invention relates to a structural component with a tubular section, particularly a structural component of a fluid line, wherein the structural component has at least two materials with different stiffness and/or creeping strength, wherein the materials include thermoplastic synthetic material and wherein the material having the greater stiffness and/or creeping strength is embedded in the other material.

2. Description of the Related Art

It is known from DE 42 39 909 to divide a structural component of a fluid line in the form of a pipe piece, to which a flexible fluid line is connected, into two parts which have thermoplastic synthetic material, wherein one part has a lower creeping tendency than the other and is injection molded around this other part. In addition, one part has a reinforced synthetic material and the other part has a non-reinforced synthetic material. In particular, the non-reinforced synthetic material includes high-density polyethylene (HDPE) and the reinforced synthetic material includes polyamide (PA). If the reinforcement consists of glass fibers, no welded connection exists between the synthetic materials at the border surface of both parts where glass fibers are located in the border surface. The connection may then become untight or may loosen. In addition, the entire synthetic material of the one part is provided with a reinforcement, even though this reinforcement would only have to be present in the areas which are subject to pressure, for example, from a clamping ring.

SUMMARY OF THE INVENTION

It is the primary object of the present invention to provide a structural component of a fluid line of the above-described type in which the connection of the synthetic materials is stronger and tighter and, if stiffening materials are required, less material has to be used.

In accordance with the present invention, the tubular section has a continuous annular surface which extends coaxially with the longitudinal center axis of the structural component and has the same material which has been injection molded over the annular surface in a predetermined quantity ratio relative to the outer material, or between 40% and 100% of the annular surface are composed of the same injection molded material and are distributed in uniform spacings in circumferential direction of the annular surface.

A continuously circumferentially extending injection molded annular surface has the disadvantage compared to an essentially point-like injection location that the injection molded material is uniformly distributed over the entire circumferential area of the tubular section, and that the material is distributed uniformly to the same extent without injecting a waviness at the front, inner end. With the exception of a slight waviness at the front end, essentially the same effect is achieved if, according to the other alternative according to the present invention, between 40% and 100% of the annular surface is composed of the injection molded material and is distributed in uniform spacings in the circumferential direction of the annular surface. This does result in a slight waviness at the inner end of the injection molded material, however, slightly less inner material is present in the annular surface and in a sprue part created during injection molding. This is of particular advantage if the inner material is of a more expensive material, for example, polyamide, than the outer material, for example, polyethylene. Moreover, when using this solution, an appropriate selection of the quantity ratio of the two materials makes it possible to adjust the total stiffness, creeping strength and/or impermeability of the tubular section relative to a through-diffusing of hydrocarbons, such as motor vehicle fuel, oil or alcohol-containing cooling water, wherein this adjustment can be locally different or in such a way that the undesirable properties of both materials are minimized. For example, if a clamping ring is used for clamping a flexible fluid line, for example, a hose, is to be used on the structural component of the fluid line, then it is only necessary to reinforce that portion in which the ring applies a pressure by injection molding a synthetic material having a higher load-bearing capacity or a reinforced synthetic material into the respective portion of the core of the outer material (synthetic material) which is still plastic. In principle, the properties of the structural component of the fluid line can be selected locally differently by different positioning of the annular surface. For example, if only a certain portion of the structural component of the fluid line is to be impermeable relative to hydrocarbons, an essentially impermeable synthetic material can be injection molded into this portion of the outer synthetic material.

As a result, it can be ensured, that the annular surface is covered by a synthetic material which is injection molded into the inner synthetic material over the annular surface, wherein the injection molded material injected later is the same as the outer synthetic material.

Preferably, it can be ensured that the quantity ratio of the embedded material relative to the outer material is in the range of 10% to 90%.

The embedded material can be selected from the group consisting of polyamide (PA), reinforced polyamide, polyethylene (PE), reinforced polyethylene, polypropylene (PP), reinforced polypropylene, polyethylene terephthalate (PET), ethylene vinyl alcohol (EVOH), polybutylene naphthalate (PBN), polyethylene naphthalate (PEN), polyoximethylene (POM), polyphenylene sulfide (PPS), and fluorothermoplastic material.

Moreover, the outer material can be selected from the group consisting of polyolefine, thermoplastic elastomer, non-reinforced polyamide, thermoplastic polyester, and thermoplastic polyesterelastomer.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is an axial sectional view of a first embodiment of the structural component according to the present invention, wherein the component is welded onto the rim of an opening of a motor vehicle tank;

FIG. 2 is a top view of a sprue piece which is obtained by using an appropriate casting molding 2 during injection molding of a synthetic material into the still plastic core of an outer synthetic material of the component, wherein the outer synthetic material has been injected first;

FIG. 3 is a side view of the sprue part of FIG. 2;

FIG. 4 is a side view of another example of a sprue part which is obtained when using another tool during injection molding of a synthetic material into the still plastic core of the outer synthetic material of the component of FIG. 1;

FIG. 5 is a top view of the sprue part according to FIG. 4;

FIG. 6 is a side view of a modification of the sprue piece according to FIGS. 4 and 5;

FIG. 7 is a top view of the sprue piece of FIG. 6;

FIG. 8 is an axial sectional view of another embodiment of the invention which results in the sprue piece of FIGS. 6 and 7;

FIG. 14 is an axial sectional view of a sixth embodiment of the invention; and

FIG. 15 is an axial sectional view of a seventh embodiment of the invention.

DETAILED DESCRIPTION OF THE INVENTION

Figure 9:
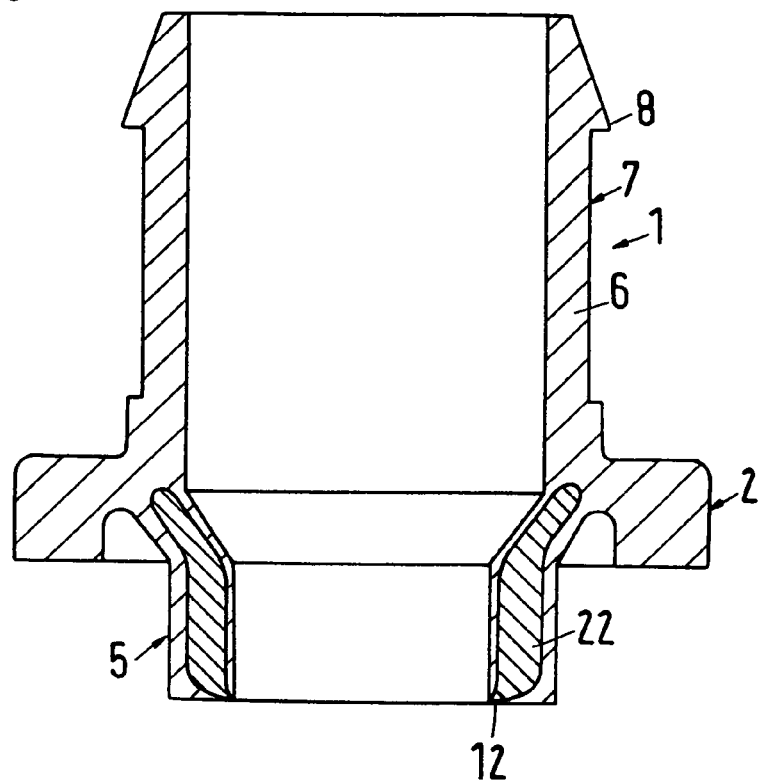
FIG. 9 is an axial sectional view of a third embodiment of the invention.

The embodiment of the structural component according to the present invention shown in FIG. 1 is a fluid line component in the form of a pipe piece with a tubular section 1 which includes a flange 2. The pipe piece serves for connecting a fluid line in the form of a hose to another structural component; in the illustrated embodiment, the other structural component is the tank 3 of a motor vehicle. In the drawing, only a part of a wall of the tank 3 with an opening 4 is illustrated. A lower end section 5 of the pipe piece extends with play through the opening 4.

The tank 3 is essentially composed of high-density polyethylene (HDPE). Consequently, the pipe piece has on the outside a material 6 which is composed of the same thermoplastic material, in the present case polyethylene (PE), which forms a melted connection with the HDPE of the tank 3. Accordingly, the flange 2 of the pipe piece is welded to the tank 3 using the friction welding method or by butt welding.

The hose is pushed over the upper end section 7 of the pipe piece past a holding rib 8 as seen in FIG. 1 and is clamped behind the holding rib 8 by means of a clampable ring, for example, a worm gear ring. Since the outer material 6 contains PE, it does not have by itself a sufficient creeping strength. Therefore, the outer material 6 could yield under the clamping pressure of the ring to such an extent that the connection between the hose and the pipe piece becomes untight and the fuel, i.e. gasoline or diesel oil, escapes into the environment. In order to prevent this, a second thermoplastic material 9 has been injection molded into the end section 7, wherein this second material 9 has a higher creeping strength. In the illustrated embodiment, the second material 9 contains a polyamide (PA) which may also be additionally reinforced, for example, by glass fibers. Polyamide has the additional advantage that it has a high diffusion blocking capability relative to hydrocarbons, such as gasoline or oil.

The material 9 is injected into the material 6 at the free end of the end section 7 as long as the material 6 has not yet fully hardened after being injected into the cavity of the molding tool. Since hardening begins at the cooler outer walls of the cavity of the molding tool, the inner portion of the material 6 remains initially plastic. The molten material 9 then penetrates into this plastic core when the material 9 is injected from the upper end of the end section 7, so that the material 6 obtains a harder core and becomes substantially thinner than the core. Depending on the selection of the ratio of the quantities or volumes of both materials 6 and 9 it is possible to determine the total creeping strength of the end section 7, its diffusion blocking capability relative to hydrocarbons, and the penetration depth of the material 9 into the material 6. Thus, in the illustrated embodiment, it is sufficient to inject the material 9 only over the short end section 7 which is subject to load from the ring, if the diffusion blocking capability is not desired or required over a longer section. Consequently, it is possible to adjust the total properties of a desired part of the pipe piece or another fluid line component in a targeted and locally defined manner, so that less expensive material 9, such as polyamide, is necessary. If the glass fibers which may possibly be contained in the material 9 are located partially at the surface of the material 9, there is no danger that the fibers are washed out by the gasoline or oil because the material 9 is almost completely surrounded by the material 6.

The injection molding tool for the material 9 is shaped in such a way that, after injecting the material 9 and opening the tool, an approximately umbrella-like sprue piece 10 is formed of the material 9 as it is illustrated in a top view and a side view in FIGS. 2 and 3, respectively. The sprue piece 10 has the circumference of an approximately discus-shaped disk 11 after hardening which remains integrally formed at the upper end of the pipe piece or end section 7. This sprue piece 10 is then cut off from the pipe piece, so that, subsequently, a continuously circumferential annular surface 12 of the material 9 remains at the upper end, i.e. on the inner side of the outer material 6; this annular surface 12 makes it possible to observe whether the material 9 has been injected over this annular surface 12 into the material 6.

In this embodiment of the sprue piece 11, the inner or front end of the injected material 9 has a uniform circumferential shape, i.e., the inner end is not wavy in the circumferential direction, but is defined essentially by straight lines, as indicated by the broken line in FIG. 1.

As an alternative to the sprue piece 10 according to FIGS. 2 and 3, it is possible to form a sprue piece 13 as it is illustrated in FIGS. 4 and 5. In this sprue piece 13, the circumference of the discus-shaped disk 14 is provided with rectangular teeth 15 which are uniformly distributed over the circumference of the disk 14 and whose gaps 16 in the circumferential direction have the same width as the teeth 15.

The teeth 15 correspond to discharge openings in the injection tool through which the material 9 has been injected into the still plastic core of the material 6. In this manner, the annular surface 12 which remains in the upper rim of the pipe piece after cutting off the disk 14 is composed of smaller annular surface sections which consist alternatingly of the material 6 and 9 and whose width corresponds to the width of the teeth 15 and the gaps 16, respectively, in the disk 14, as illustrated in FIG. 8. Instead of a straight limiting line, as it is shown as a broken line in FIG. 1, this results in this case in a slightly wavy limiting line 21, as schematically illustrated in FIG. 8 in the form of the dotted wavy line. Because of the gaps 16, a somewhat smaller amount of material 9 has to be used for the sprue piece 13 as compared to the sprue piece 10 of FIGS. 2 and 3. The annular surface 12 also contains less material 9.

Preferably, between 40% and 100%, i.e. more than 40% and less than 100%, of the annular surface 12 are of the same injected material 9 which contains polyamide, wherein this portion is distributed with uniform spacings in the circumferential direction of the annular surface 12 at the upper end of the pipe piece shown in FIG. 8.

The further modification of the sprue pieces of FIGS. 1 to 5 shown in FIGS. 6 and 7 demonstrate that the sprue piece 17 also includes a toothed disk 18 whose teeth 19 and gaps 20 have at the radially outer end the same width as the teeth 15 and the gaps 16 of the sprue piece 14 of FIGS. 4 and 5. However, the gaps 20 are radially deeper. In this case, still the same wavy line shown in dotted lines in FIG. 8 results as the limiting line 21 of the inner material 9, as in the sprue piece 13 of FIGS. 4 and 5. In the same manner, after cutting the sprue piece 17 from the pipe piece of FIG. 8, the same annular surface sections of the materials 6 and 9 remain at the free end of the end section 7, as in the modification of the sprue piece 13 according to FIGS. 4 and 5. However, because of the presence of the deeper gaps 20 between the teeth 19, a smaller quantity of less expensive material 9 (polyamide) is required for the sprue piece 17 than is required for the sprue piece 13. Also, because of this configuration, the waste caused by the respective sprue piece of the expensive material 9, which predominantly contains polyamide, is lower.

In addition, by changing the ratio of the width of the teeth 15 or 19 relative to the width of the gaps 16 and 20 between the teeth, it is possible to determine the flow speed of the material 9 pressed out of the injection tool by means of a piston and, thus, the axial penetration depth of the material 9 into the still plastic core of the material 6.

The penetration depth is also determined by the ratio of the quantities or volumes of the materials 6 and 9: the greater the quantity of the material 9 in relation to the material 6, the greater the penetration depth and vice versa. In addition, sufficient space is made available in the cavity of the molding tool for receiving the quantity of outer material 6 which has been displaced by the material 9. The number of teeth 15 or 19 and their width also determines the width of the annular surface sections of the material 9 in relation to the total annular surface 12 and, thus, also the volume ratio of the materials 6 and 9 in the end section 7 and the axial penetration depth of the material 9 in the material 6, so that only that quantity of the expensive material 9 is used as is necessary, for example, for increasing the total creeping strength relative to the pressure exerted by the clamping ring during clamping of the hose on the end section 7. Other total properties of the end section 7 can also be chosen by the selection of the volume or quantity ratio of the materials 6 and 9, for example, the diffusion blocking capability or impermeability to hydrocarbons.

Also, the total properties of the pipe piece can be locally predetermined depending on the selection on the above-mentioned volume or quantity ratios and in dependence on the selection of the location of the annular surface 12 and the configuration of the sprue tool and sprue pieces.

Figure 10:
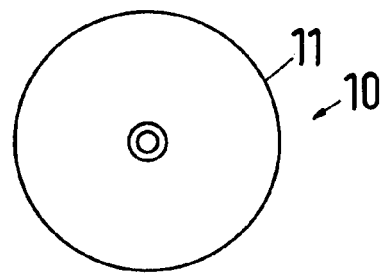
FIG. 10 is a top view of a sprue piece which is obtained by using an appropriate sprue tool, however, with a somewhat smaller diameter than the sprue piece according to FIGS. 2 and 3.
Figure 11:
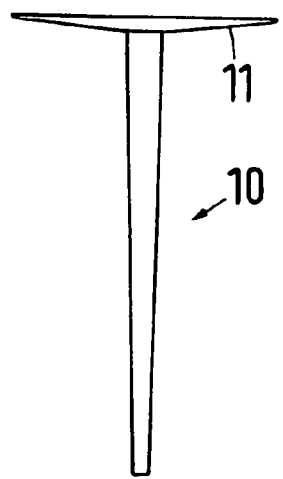
FIG. 11 is a side view of the sprue piece according to FIG. 10.

Thus, in the embodiment of the component also constructed as a pipe piece and shown in FIG. 9, a material 22 containing synthetic material has only been injected into the lower end section 5 over the annular surface 12 at the lower end of the pipe piece, wherein the injection was effected by means of an injection molding tool in which a sprue piece shown in FIGS. 10 and 11 is formed which is similar to that illustrated in FIGS. 2 and 3, except that the diameter of the disk 11 at the sprue piece 10 of FIGS. 10 and 11 is smaller in accordance with the inner diameter of the end section 5 than that of the sprue piece 10 shown in FIGS. 2 and 3. However, the synthetic material of the material 22 is an elastomer in order to achieve between the end sections 7 and 5 a desired higher, relatively elastic bending capability. If the fluid to be conducted through the tubular section 1 does not contain a hydrocarbon, it is not necessary to inject into the end section a material 9 having a higher diffusion blocking capability. In the same manner, the end section 7 does not have to have a higher creeping strength than the material 6 if only a fluid line of a synthetic material is to be pushed onto the end section 7, wherein the fluid line secures itself on the end section 7.

Instead of the continuously circumferentially extending annular surface 12 at the end, it is also possible to provide an annular surface 12 according to FIG. 8 at the lower end of the pipe piece, wherein the injected material, i.e., the material 22, is distributed in uniform spacings over the annular surface at the end, wherein the injected material 22 also forms at least 40% of the total annular surface 12 composed of the two materials 6 and 22.

Figure 12:
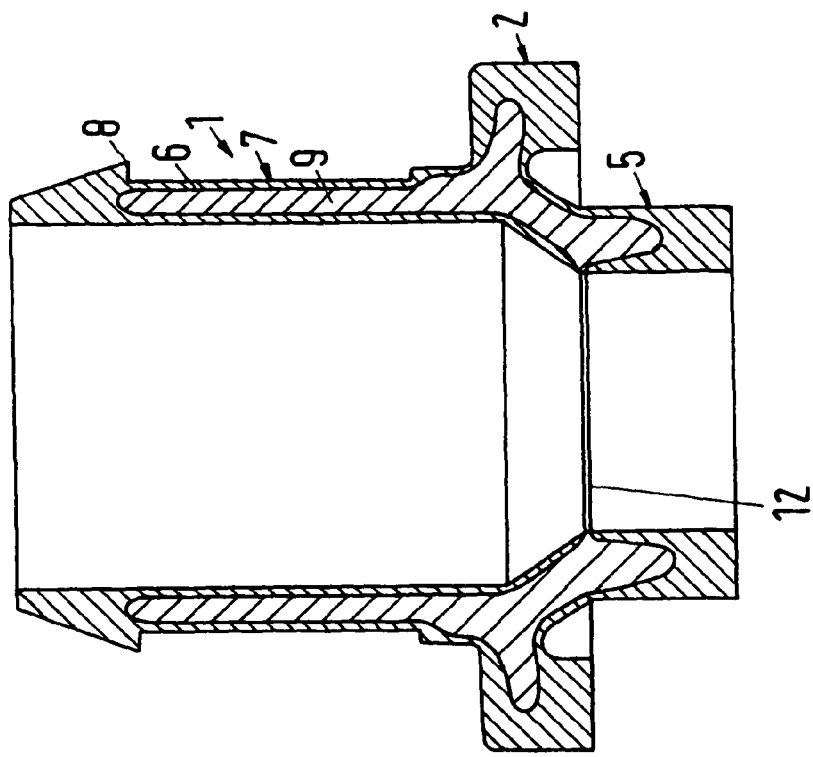
FIG. 12 is an axial sectional view of a fourth embodiment of the invention.

In the embodiment of FIG. 12, in turn, the same material 9 as it has been used in the embodiments according to FIGS. 1 and 8, i.e. polyamide, with glass fiber reinforcement has been injected into the section 1, i.e., into the two end sections 5 and 7 and additionally into the flange 2. In this case, the annular surface 12 is located within the end section 5; for forming the end section 5, again an injection tool has been used which results in the sprue piece 10 illustrated in FIGS. 10 and 11. The material 9 extends into both end sections 5 and 7 and the flange 2, so that the two end sections 5 and 7 and the flange 2 are essentially impermeable to hydrocarbons, on the one hand, and to form the end section 9, which is subjected to the greatest pressure, with the greatest creeping strength possible.

Figure 13:
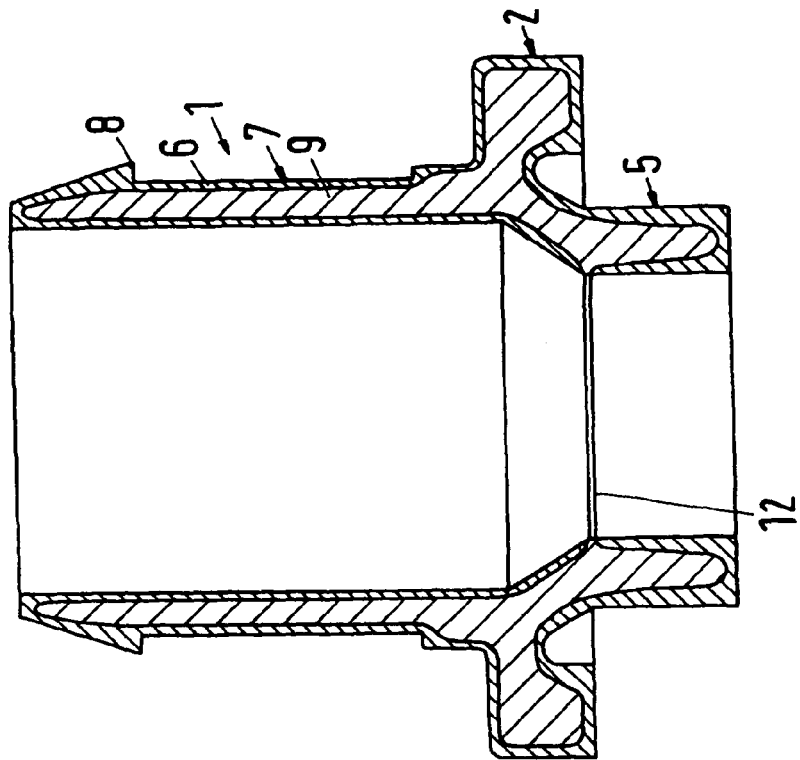
FIG. 13 is an axial sectional view of a fifth embodiment of the invention.

The embodiment of FIG. 13 corresponds essentially to that of FIG. 12, except that the material 9 which is of glass fiber-reinforced polyamide, is even further injected into the end sections 5 and 6 and the flange 2.

The embodiment of FIG. 14 differs from that of FIG. 12 only in that a third material 23 of synthetic material has been injection molded into the material 9 over the annular surface 12 into the transition area between the end sections 5 and 7. The material 23 contains the same synthetic material as the material 6, i.e., polyethylene (PE). The polyethylene covers the glass fiber-reinforced material 9 over its entire surface. As a result, the glass fibers of the material 9 cannot be washed out of the annular surface 12 by hydrocarbon-containing fluids such as gasoline or oil, which flow through the pipe piece. Alternatively, the material 23 may also be an elastomer if the transition area between the end sections is to have the highest bending capability. Simultaneously, a portion of the more expensive polyamide-containing material 9 is not used.

The embodiment of FIG. 15 differs from that of 14 only in that the material 23 extends up to the end section 7 and further into the flange 2, so that the bending capability of the end section 7 is increased when using an elastomer as the material 23, and an even smaller amount of expensive polyamide contained in material 9 has to be used.

Instead of the material PE mentioned above and the glass fiber-reinforced PA, the inner or embedded material may be selected from the group consisting of PE, PP, reinforced PP, PBT, PET, EVOH, PBN, PEN, PON, PPS, and fluorothermoplastic material. The outer material 6 may alternatively be selected from the group consisting of polyolefin, thermoplastic elastomer, non-reinforced PA, thermoplastic polyester, and thermoplastic polyester elastomer.

While specific embodiments of the invention have been shown and described in detail to illustrate the inventive principles, it will be understood that the invention may be embodied otherwise without departing from such principles.

I claim:

1. A structural component comprising a tubular section composed of at least two materials having different stiffnesses and/or creeping strengths, wherein the materials contain thermoplastic synthetic materials and one of the materials having a greater stiffness and/or creeping strength is embedded in the other material by injection, the tubular section comprising an annular surface extending coaxially to the longitudinal center axis of the structural component, wherein between 40% and 100% of the annular surface is composed of the injected material so as to form a portion having uniform spacings of the injected material distributed in a circumferential direction of the annular surface.

2. The structural component according to claim 1, wherein the annular surface is covered by a synthetic material subsequently injected into the inner synthetic material over the annular surface, wherein the synthetic material is the same as the outer synthetic material.

3. The structural component according to claim 1, wherein a quantity ratio of the embedded material relative to the outer material is in the range of 10% to 90%.

4. The structural component according to claim 1, wherein the embedded material is selected from the group consisting of polyamide (PA), reinforced polyamide, polyethylene (PE), reinforced polyethylene, polypropylene (PP), reinforced polypropylene, polyethylene terephthalate (PET), ethylene vinyl alcohol (EVOH), polybutylene naphthalate (PBN), polyethylene naphthalate (PEN), polyoximethylene (POM), polyphenylene sulfide (PPS), and fluorothermoplastic material.

5. The structural component according to claim 1, wherein the outer material is selected from the group consisting of polyolefin, thermoplastic elastomer, non-reinforced polyamide, thermoplastic polyester, and thermoplastic polyester elastomer.

6. The structural component according to claim 1, wherein the annular surface is arranged on a radially inner side of the other material of the tubular section.

\* \* \* \* \*